United States Patent [19]

Kano et al.

[11] Patent Number: 5,913,221
[45] Date of Patent: Jun. 15, 1999

[54] AUTOMATED RECOGNITION OF AND DISTINCTION AMONG GRAPHICS INPUT, TEXT INPUT, AND EDITING COMMANDS IN A PEN BASED COMPUTER

[75] Inventors: Shigeru Kano; Yasuhiro Nakada; Yutaka Usuda, all of Yokohama, Japan

[73] Assignee: Hitachi Software Engineering Co., Ltd., Kanagawa-ken, Japan

[21] Appl. No.: 08/646,610

[22] Filed: May 8, 1996

Related U.S. Application Data

[63] Continuation of application No. 08/178,202, Jan. 6, 1994, abandoned.

[30] Foreign Application Priority Data

Jan. 8, 1993 [JP] Japan ................................. 5-001847

[51] Int. Cl.⁶ .................................................. G06F 17/24
[52] U.S. Cl. .................................................. 707/530
[58] Field of Search ................................. 395/766–769, 395/763, 358, 804; 707/500, 530–531, 502

[56] References Cited

U.S. PATENT DOCUMENTS

| | | | |
|---|---|---|---|
| 4,815,029 | 3/1989 | Barker et al. | 707/516 |
| 4,933,880 | 6/1990 | Borgendale et al. | 707/515 |
| 5,113,492 | 5/1992 | Ariki et al. | 707/520 |
| 5,150,458 | 9/1992 | Masuzaki et al. | 707/511 X |
| 5,204,946 | 4/1993 | Shimamura | 707/515 |
| 5,233,685 | 8/1993 | Landes et al. | 707/542 |
| 5,261,038 | 11/1993 | Adroher et al. | 395/103 |
| 5,278,918 | 1/1994 | Bernzott et al. | 382/176 |
| 5,375,197 | 12/1994 | Kang | 358/462 |
| 5,388,195 | 2/1995 | Aoyama | 358/453 |
| 5,408,599 | 4/1995 | Nomura et al. | 707/516 |
| 5,448,692 | 9/1995 | Ohta | 707/520 |
| 5,459,826 | 10/1995 | Archibald | 707/517 |
| 5,465,304 | 11/1995 | Cullen et al. | 382/176 |

FOREIGN PATENT DOCUMENTS

| | | |
|---|---|---|
| 62-190565 | 8/1987 | Japan . |
| 64-13682 | 1/1989 | Japan . |
| 1-237882 | 9/1989 | Japan . |
| 2193827 | 2/1988 | United Kingdom . |
| 2199169 | 6/1988 | United Kingdom . |
| WO92/08183 | 5/1992 | WIPO . |
| WO92/16900 | 10/1992 | WIPO . |

OTHER PUBLICATIONS

Lotus, The Lotus Guide to Learning Symphony, p. 77, 1984.
Nikkei Byte, Apr. 1991, pp. 232–239.

*Primary Examiner*—Anton Fetting
*Attorney, Agent, or Firm*—Fay, Sharpe, Beall, Fagan, Minnich & McKee

[57] ABSTRACT

Disclosed is the system for editing characters and graphics through a computer with a data entered via the pen point entry procedure. The system comprises the input device for entering the data, the data processor for processing the data entered, the data storage for storing the data entered, the display device for displaying the display data, and the pen through which the data is entered. With this system, information containing characters and graphics as well as the editing request in a mixed manner can be entered through pen points without paying any consciousness to the entry of commands, as well as the characters, graphics and the commands can be subjected to processing.

11 Claims, 13 Drawing Sheets

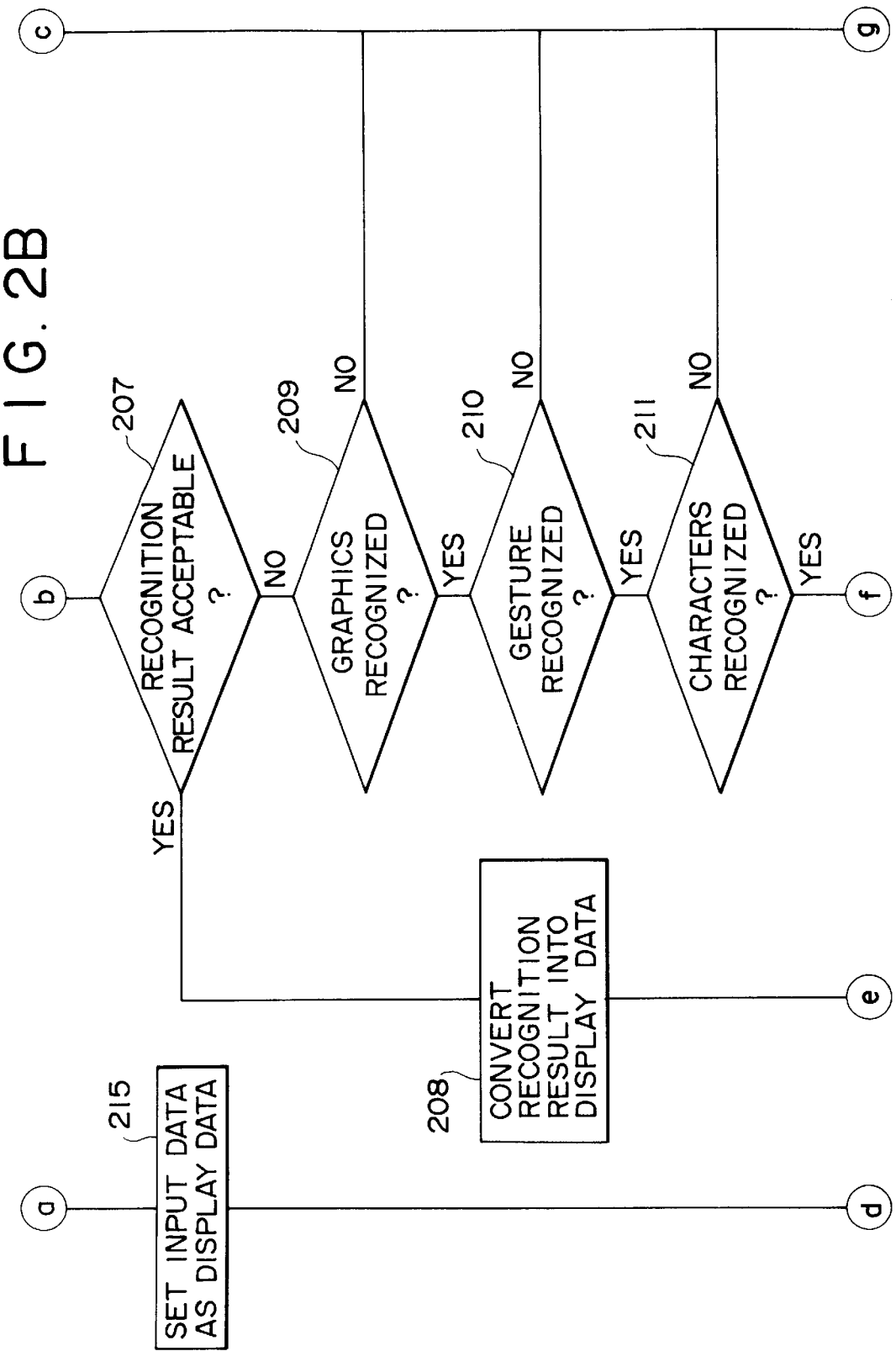

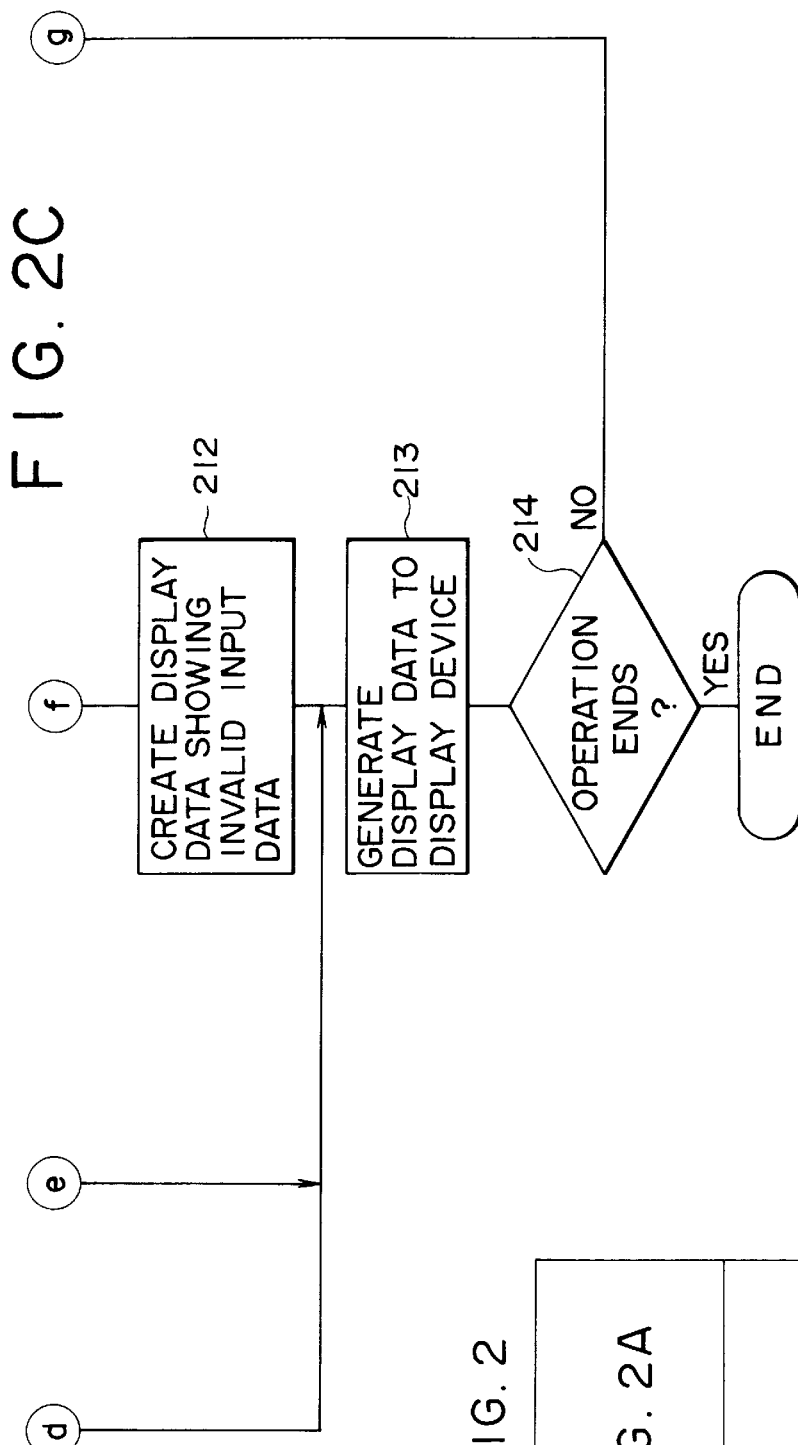

FIG. 3B
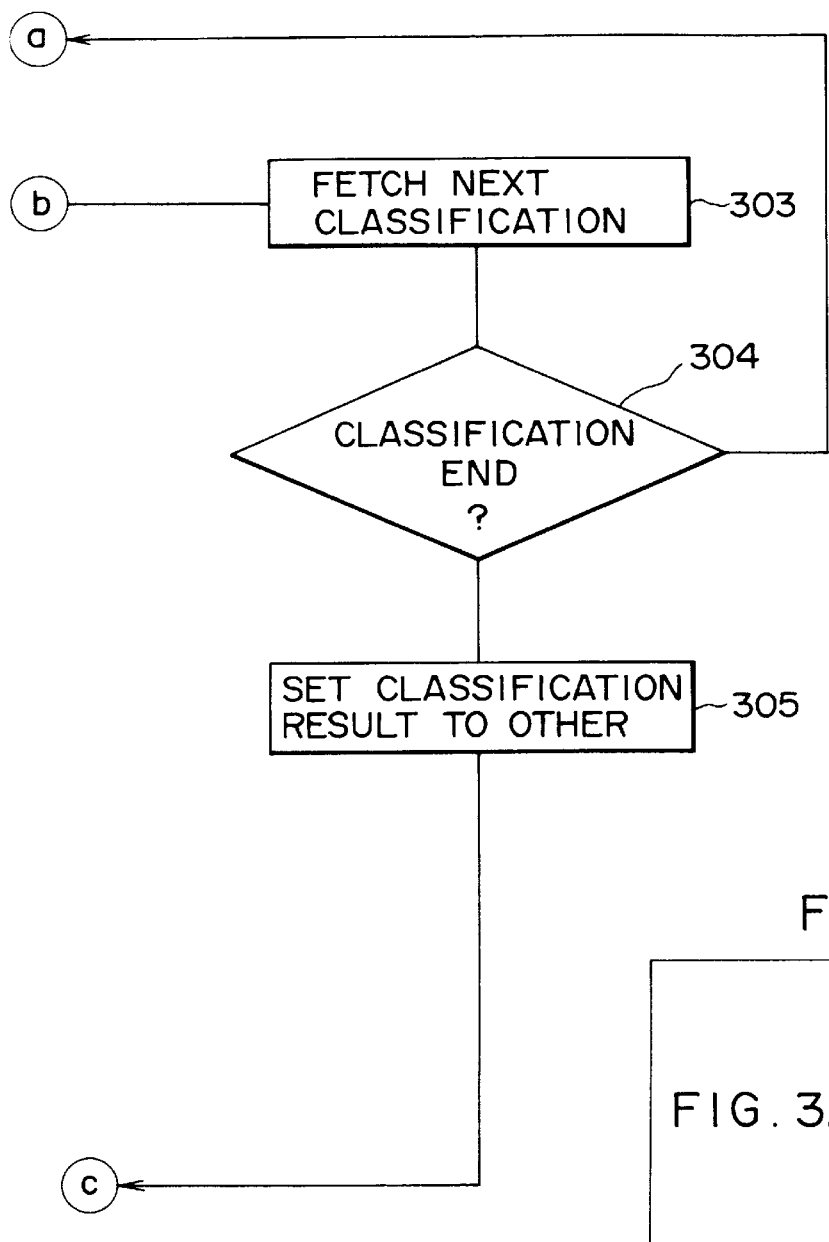
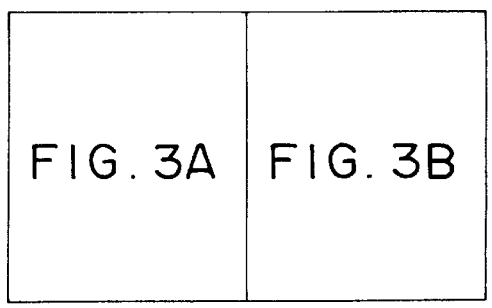
FIG. 3

F I G. 7
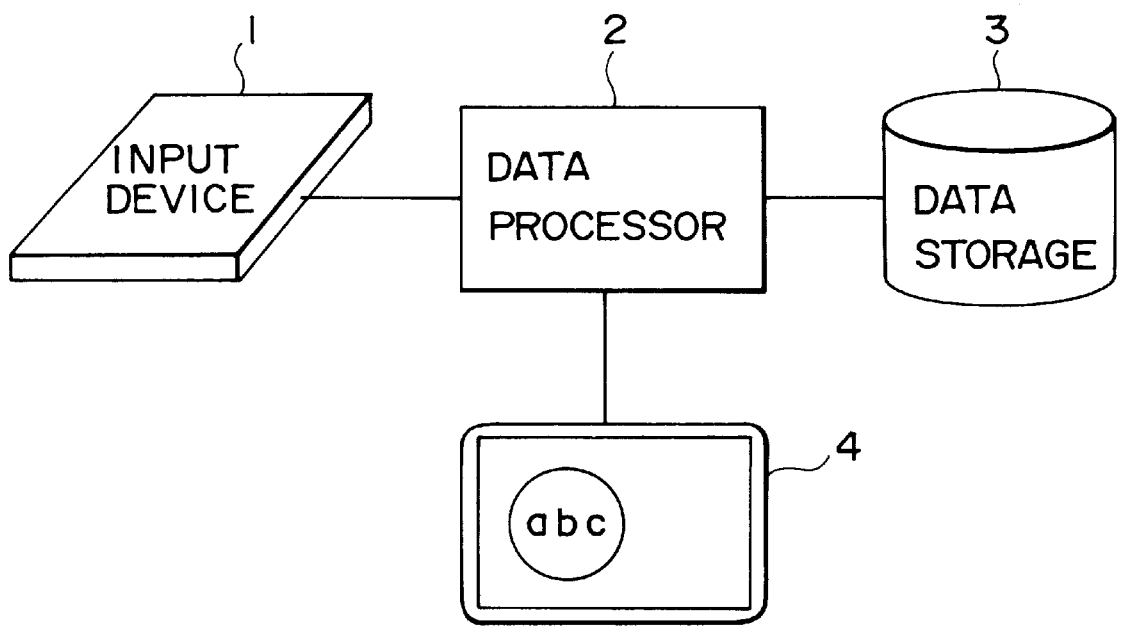
F I G. 8
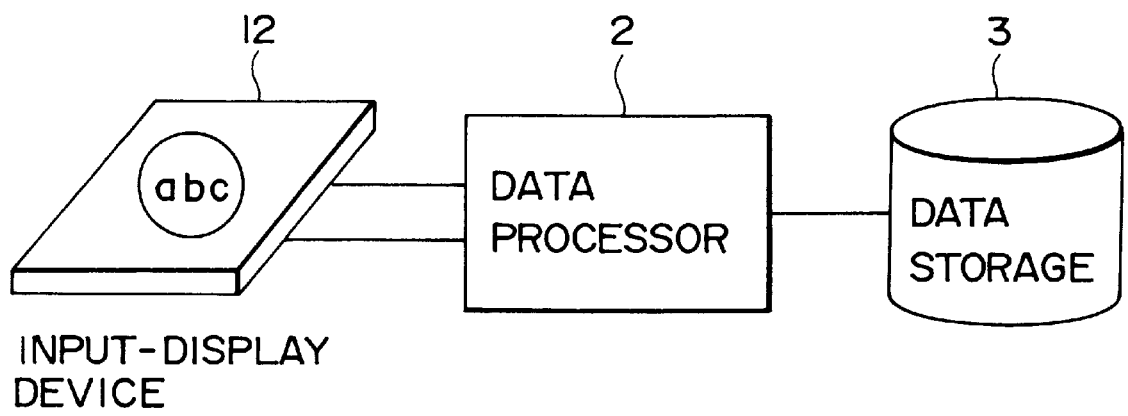

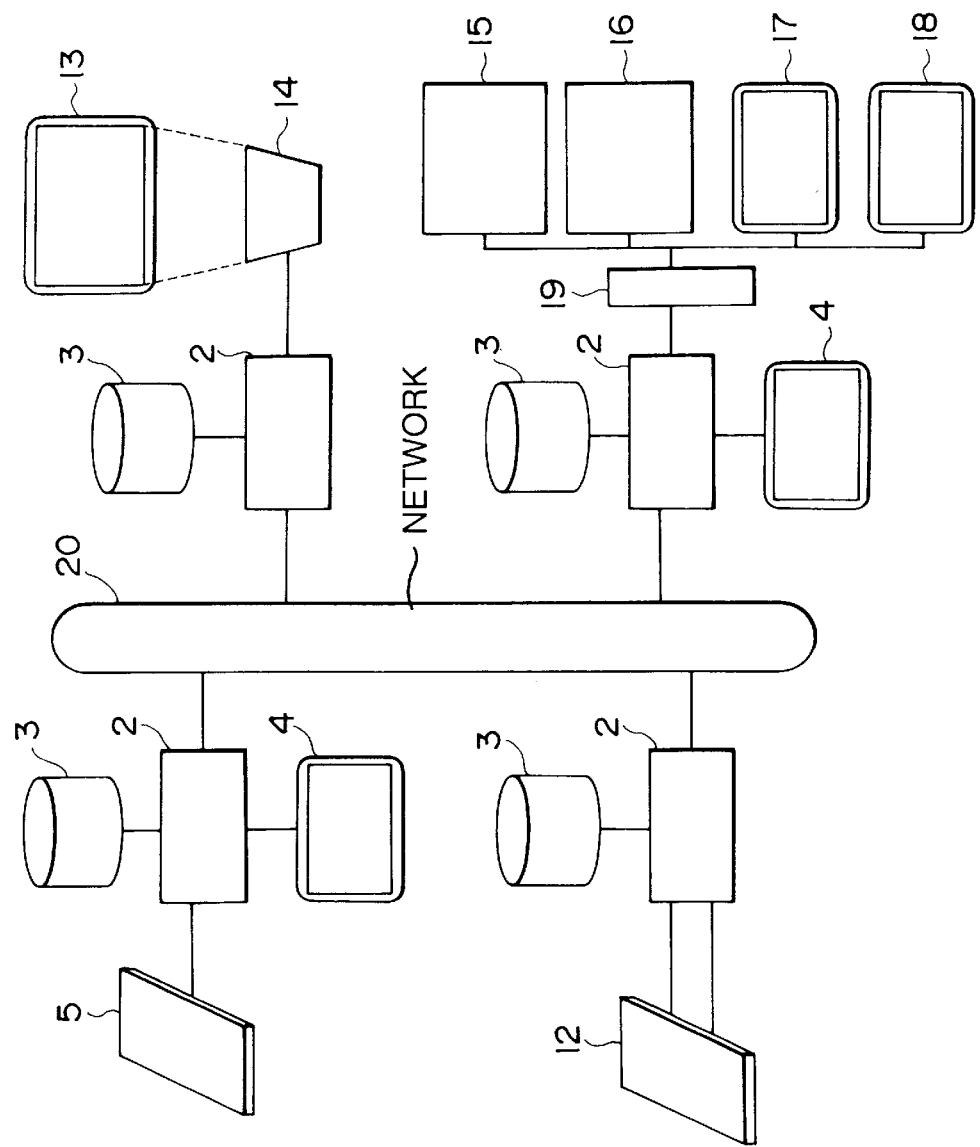

AUTOMATED RECOGNITION OF AND DISTINCTION AMONG GRAPHICS INPUT, TEXT INPUT, AND EDITING COMMANDS IN A PEN BASED COMPUTER

This is a continuation application of Ser. No. 08/178,202, filed Jan. 6, 1994, now abandoned.

BACKGROUND OF THE INVENTION

The present invention relates to a system for editing characters and graphics through a computer so adapted as for a data to be entered by pen points.

Generally, the method for editing characters and graphics through a computer system includes, for example, the entry of characters and graphics by operation of a keyboard of the computer system. This method involves assigning a particular key to a particular character or graphic or a request for editing and executing the particular processing when a user selects the particular key.

It is also known that an object for editing can be selected by a user from a display of graphics prepared in advance. This system employs a selecting device for selecting the object for editing, such as the keyboard, a pointing device, e.g. the mouse, the joystick or the trackball, fingers or the electronic pen. It is further Known that the method for the display of an object of editing on an editing screen can be employed for the display unit or that a display unit different from an editing screen such as the graphics tablet or the like can be employed therefor.

Furthermore, it is known that the keyboard is combined with the selecting device and that characters are entered through the keyboard as well as the graphics and the requests for editing are entered through the selecting device.

On the other hand, it is known of a computer that allows the entry of characters and graphics as well as editing operation to be executed via the pen point entry without using the keyboard.

In particular, the method for the editing operation by utilizing the pen point entry method includes a gesture that is designed on the basis of correction symbols for correcting sentences. The gesture means to translate the movement of the pen point into an editing command, as disclosed, for example, in Nikkei Byte, pp. 232–239, No. 4, 1991.

A conventional editing technology for editing characters and graphics via the pen point entry method is disclosed in Japanese Patent Unexamined Publication (Kokai) No. 62-190,565. This technology involves displaying on the display screen an editing mode comprising commands, such as characters recognition, graphics creation, manual entry, and so on, and having the user designate the particular command on the editing mode through the pen point entry, thereby providing for the determination of the characters, the graphics or the request for editing.

Further, Japanese Patent Unexamined Publication (Kokai) No. 64-13,682 discloses the technology of determining on the basis of the attribute such as the number or length of continual bit data groups of a manually written data if the manually written data represents characters or graphics.

In addition, Japanese Patent Unexamined Publication (Kokai) No. 1-237,882 discloses the technology of providing for the entry and recognition of the characters and graphics entered through the pen points and for the operation for editing by entering a particular graphic shape through the pen point entry.

For the conventional technology as described hereinabove, the method utilizing the keyboard generally requires special training for operating the keyboard. Further, this method requires a multi-dimensional data of a graphic to be converted into or replaced with a one-dimensional dimensional data such as a sequence of characters or symbols, so that this method can be said to be less suitable for graphics processing. In addition, the method utilizing the keyboard can be said to be efficient for the operation by employing the particular graphics only to thereby select the object of displaying; however, it is less efficient for the entry of characters.

Furthermore, the device utilizing the graphics tablet becomes expensive. In addition, in the event where the editing is executed by utilizing both of the keyboard and the graphics tablet, the keyboard is required to be replaced with the graphics tablet or vice versa during the operation of the device. This is very laborious in handling.

On the other hand, the conventional editing method utilizing the pen point entry requires the editing mode to be replaced or shifted whenever the editing operation is needed. This method is also laborious in handling and time consuming. Further, this method suffers from the disadvantage that the pen point entry cannot be employed for the editing operation. It is also disadvantageous because this method requires the keyboard, too.

It is to be noted that, generally, they write characters or graphics on paper with a pencil or the like and additionally write characters or graphics or a request for editing without paying any particular consciousness to an editing mode, when they wish to correct the characters or graphics written on the paper. Hence, the conventional methods place limitations to the user, the location of usage and the time of usage. Further, they do not provide the user with the way of operation as natural as writing characters and graphics on paper with a pencil or the like; hence, they present the problems that the area of utilization of the computer cannot be expanded in the field of the graphics processing.

In addition, the technology as disclosed in Japanese Patent Unexamined Publication (Kokai) No. 64-13,682 contains nothing about the pen point entry for the editing operation for editing characters and graphics and such editing operation. Further, even if this technology could be so extended as to utilize a gesture command, it cannot recognize the gesture command correctly because it cannot distinguish such gesture command from recognizable characters or graphics having a shape similar to the gesture command. On the other hand, Japanese Patent Unexamined Publication (Kokai) No. 1-237,882 discloses to the effect that the operation of processing, such as setting parameters, data storage, data retrieving, data deletion, hard copy and so on, can be made from the menu selection screen through the keyboard. This technology is remote from the editing procedures via the pen point entry.

SUMMARY OF THE INVENTION

The present invention has the object to provide a system for editing a character or graphic through pen point entry, which can solve the problems inherent in the conventional editing technology as described hereinabove.

The system according to the present invention comprises a computer system having a pen point entry means for solving the problems inherent in conventional systems, comprising a characters recognizing means for recognizing characters; a graphics recognizing means for recognizing graphics; an editing request recognizing means for recognizing a request for editing; a decision and recognition means for deciding and recognizing to which kind, that is, to a character, a graphic or an editing request, a locus of the pen point entry belongs; a storage mans for a result of decision and recognition; a display means for displaying the result of decision and recognition; and a correction means for correcting an error to be caused in the locus upon pen point entry of a data is corrected. When it is decided that the locus of the pen point entry belongs to either of the kind representing a character data, a graphic data or a command for the request for editing, each of the characters recognizing means, the graphics recognizing means and the editing request recognizing means, is provided with the order of priority, the order of priority provided for each of the recognizing means may dynamically be changed, the recognizing means having a lower order of priority may be excluded from an object of recognition and the order of priority of each of the recognizing means is determined with reference to the locus of the pen point entry or to the previous results of recognition. In addition, the locus of the pen point entry may be subjected to all parallel recognizing processing as an object of recognition and the results of recognition by all the recognizing means are compared. Thereafter, the recognizing means having the highest order of priority is adopted from the most acceptable results of recognition, the locus of the pen point entry is converted into an easily visible shape or arrangement in order to decide and recognize the locus of the pen point entry, and the result of recognition is displayed without recognizing the locus of the pen point entry.

The system according to the present invention has a character, a graphic or a request for editing entered in the form of a locus of the pen point entry through the entry means and can determine and recognize the locus of the pen point entry as the character, the graphic or the editing request. Further, this system can display the result of processing in a shape or arrangement clear or readily visible for deciding and recognizing the locus drawn and entered through the pen point entry.

Other objects, features and advantages of the present invention will become apparent in the course of the description of the preferred embodiments with reference to the accompanying drawings.

BRIEF DESCRIPTION OF THE DRAWINGS

FIGS. 2A–2C is a flow chart showing procedures of the operation processing according to the present invention.

FIGS. 3A and 3B is a flow chart showing procedures of processing for determining a kind of a locus entered through pen point entry.

FIG. 7 is a diagram showing an example of the configuration of a system comprising an input device and a display device.

FIG. 8 is a diagram showing an example of the configuration of a system in which an input device is integral with a display device.

FIG. 11 is a diagram showing an example of the configuration of a system in which devices are connected with each other through a plurality of networks

DESCRIPTION OF THE PREFERRED EMBODIMENTS

Figure 1:
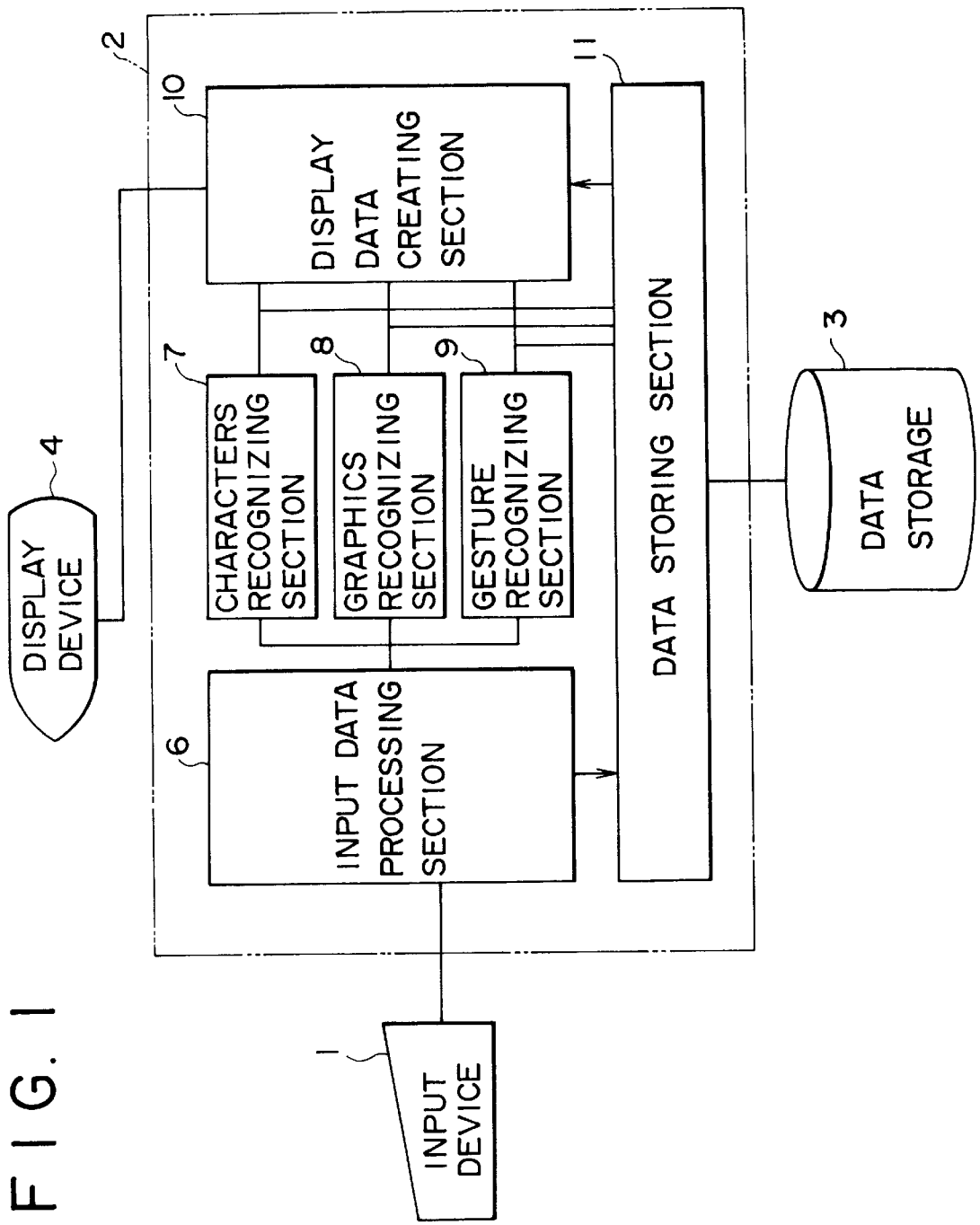
FIG. 1 is a diagram showing the configuration of a basic system according to an embodiment of the present invention.

FIG. 1 shows the system configuration according to the present invention, which comprises an input device 1 for entering a data, such as a graphic, a character or a request for editing (referred to hereinafter as "gesture"), through pen point entry, a data processor 2 for subjecting the input data to processing, a data storage 3 for storing the input data, a display device 4, and a pen 5.

Further, the data processor 2 comprises an input data processing section 6, a characters recognizing section 7, a graphics recognizing section 8, a gesture recognizing section 9, a display data creating section 10, and a data storing section 11. The data storing section 11 is arranged to store the results obtained by recognizing the locus entered through pen point entry by each of the recognizing means. The input device 1 and the pen 5 are not restricted to particular ones as long as they can create and detect the locus of the pen point entry, and the method of entering the locus of the pen points may be the one utilizing electromagnetic waves, supersonic waves, static electricity, pressure or the like. The method of detecting such medium is not restricted to a particular one.

Figure 2A:
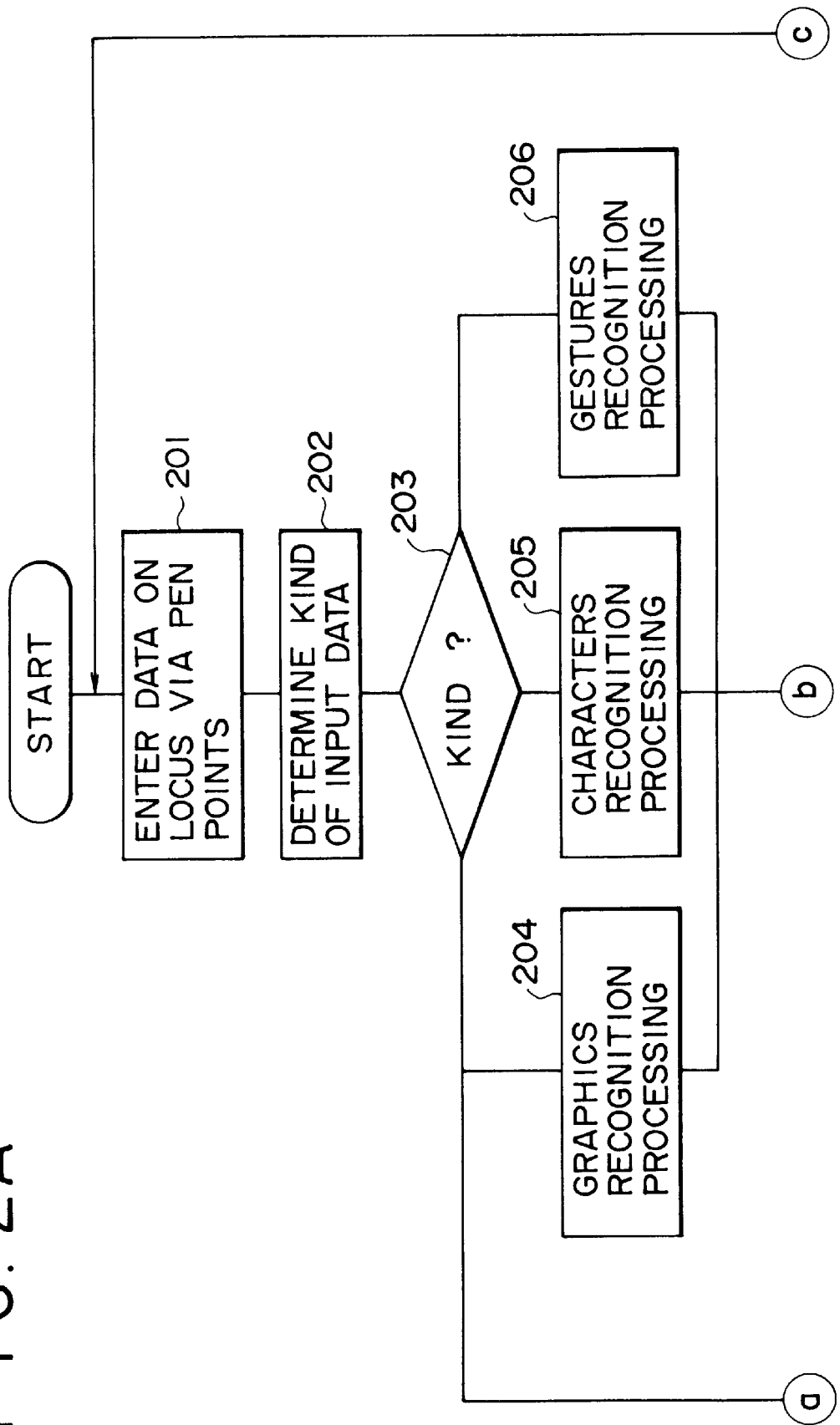

FIG. 2 shows the flow chart for the processing to be executed by the data processor 2.

First, a data on a locus drawn with the pen 5 is entered from the input device 1 at step 201, followed by proceeding to step 202 at which the kind of the input data is determined as to whether it represents a graphic, a sequence of characters, a gesture or anything else. Then, at step 203, it is decided if the result of determination at step 202 represents a graphic, a character or a request for editing. When it is decided at step 203 that the input data represents a graphic, then the program flow goes to step 204 at which a request for recognizing graphics is made. If the decision at step 203 shows that the kind of the locus thereof is a character, a request for recognizing characters is made at step 205. Further, if it is decided at step 203 that the kind of the locus thereof is a gesture, then the program flow goes to step 206 at which a request for recognizing gestures is made. Thereafter, it is decided at step 207 to determine if the result of recognition is acceptable or reasonable and, when this decision indicates that the result of recognition is acceptable or reasonable, then the program flow goes to step 208 at which the result of recognition is converted into a display data.

On the other hand, when it is decided at step 207 that the result of recognition is not acceptable or reasonable, then a further decision is made at steps 209–211 to determine if all kinds of recognition have been processed, i.e., specifically, if the graphic is recognized, if the gesture is recognized, and if the character is recognized, respectively. If no decision is made, a decision of the kind of the input data made at step 202 is executed again. When all the kinds are decided yet no acceptable or reasonable result can be acquired, the input data is converted into a display data as "invalid" at step 212. Then, the display data is set and generated into the display device at step 213. These procedures are repeated until it is decided at step 214 that the operation has been terminated.

In proceeding with the decision at steps 202 and 203, when it is decided that the kind of the input locus is "other", the locus is not converted and the input data is set as a display data as it is at step 215. The display data is displayed as it is as a scribble. In some cases, the data is made invalid without making any decision and recognition in accordance with the input status of an input locus or usage thereof.

Figure 5:
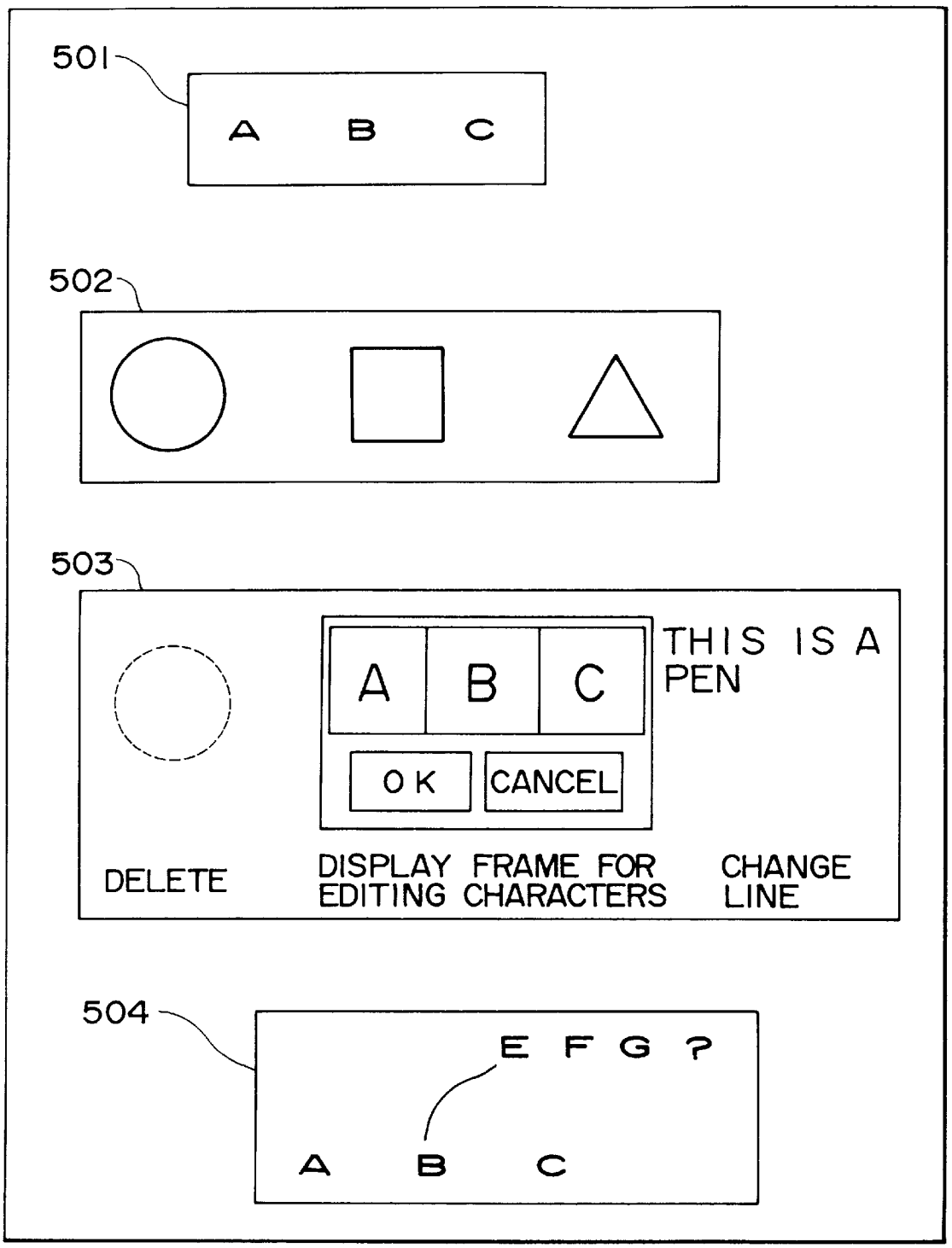
FIG. 5 is a diagram showing an example of a display data.

The decision processing to be made at step 202 in order to determine whether the kind of the input data represents the character, the graphic, the editing request or others is executed with the input processing section 6. The input data is provided with such information as indicating the kind of the data. This information is determined by the length of the input data entered, the position thereof, the edited status thereof, the attribute thereof, the designation by a user, the order thereof, and so on. An example of information to be added is shown in FIG. 5. By referring to this information, the input data is decided to belong to which kind. In addition, the data which could not be determined with the input data processing section 6 is then transferred to each of the recognizing means and the result of recognition which is decided to be the most acceptable or reasonable so as to represent the right kind of the input data is determined as the kind of the input data.

Further, the object of recognition is subjected to parallel processing at steps 204, 205 and 206 with each of the recognizing means, respectively. When a decision is made at step 207 as to whether the result of recognition is acceptable or reasonable, the result of recognition having the highest order of priority is checked first, followed by checking the result of recognition having the lesser highest order of priority and by adopting the first acceptable or reasonable result of recognition.

The decision to be made at step 207 as to whether the result of recognition is acceptable or reasonable may be carried out, for example, by merely deciding to determine if the result of recognition corresponds to a graphic, a character or a gesture determined by each recognizing processing or by making a decision to determine if an input data entered has some meaning even if recognized. The method for the decision may vary with the field in which the system is utilized. For instance, for a graphic editor, when the input data is recognized as some graphic as a result of graphics recognition, the graphic is determined as acceptable or reasonable as it is, because the graphic editor can edit all graphics. Further, a diagram such as a data flow diagram determines a triangle or a diamond shape as a meaningful graphic; hence, it is decided that graphics other than such graphics such as a square or a circle are determined as less acceptable or reasonable. In addition, in the case of a gesture and so on, when no object is selected for a gesture, such as deleting or transferring, for which the object selected requires, the input data is decided as being not acceptable or reasonable.

Figure 3A:
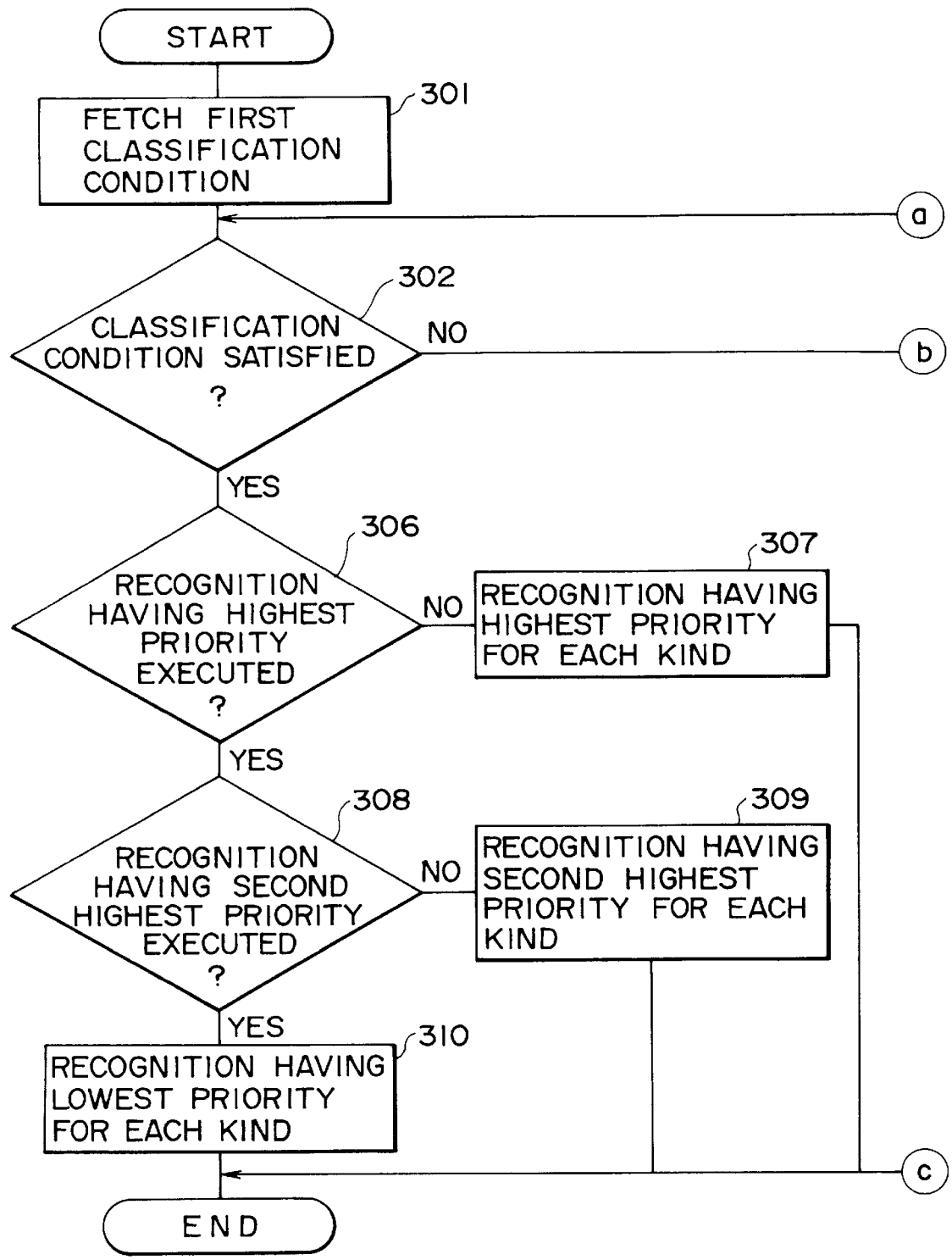

FIG. 3 is a flow chart showing procedures for processing a decision for determining the kind of the input data to be performed at step 202.

Initially, at step 301, a first classification condition as shown in a table below is fetched, followed by proceeding to step 302 at which it is decided to determine if the input data satisfies the first classification condition. When the decision at step 302 indicates that the input data does not meet the first classification condition, then the program flow goes to step 303 at which a second classification condition is fetched. Likewise, when these procedures are repeated until the last classification condition is fetched at step 304, the results of the decisions for determining the kind of the input data are set to "other" at step 305. On the other hand, when it is decided at step 302 that the classification condition is met, then the result of recognition having the highest order of priority is selected as the kind for recognition (steps 306–307). When the result of recognition having the highest order of priority has been recognized, then the result of recognition having the next highest order of priority is selected as the kind for recognition (steps 308–309). When the result of recognition having the next highest order of priority has also been recognized, then the result of recognition having the next highest order of priority is selected as the kind for recognition. At last, when the result of recognition having the next lowest order of priority has also been recognized, then the result of recognition having the lowest order of priority is selected as the kind for recognition at step 310.

Now, a description is made of the case, for example, where a locus of pen point entry is entered on the characters "ABC" as indicated by reference numeral 403 in FIG. 4, with reference to FIG. 3 and the table as will be described hereinafter. In this case, it is first decided that the size of the locus is larger than a predetermined size of certain characters; it is then decided that the position of the locus overlaps with a display data and that the display data has already been created; and it is further decided that the attribute, information on users and order are not designated. In this situation, the order of priority is decided for each case and the kind of the locus entered is decided and determined as a gesture.

Figure 4:
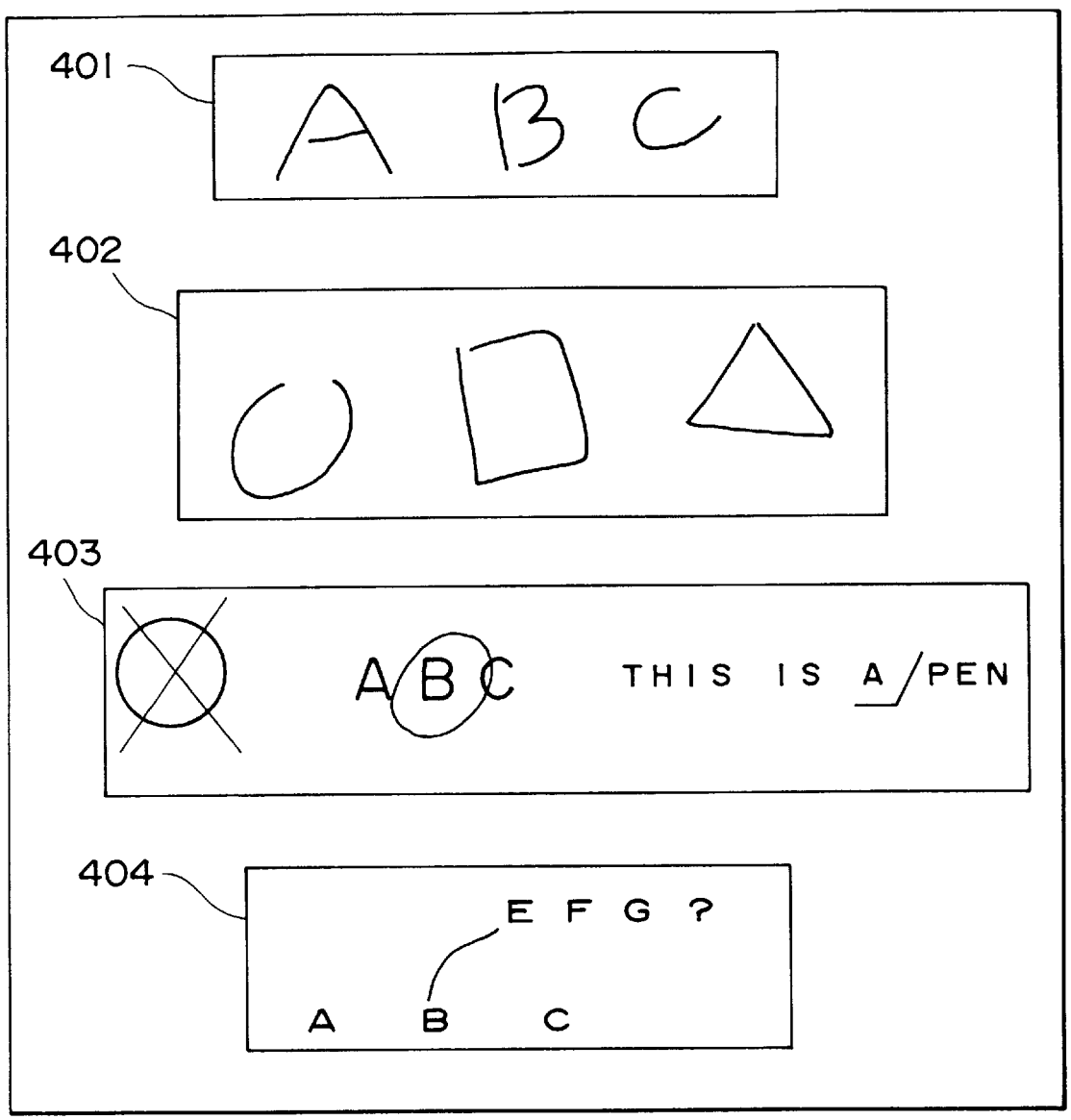
FIG. 4 is a diagram showing an example of an input data.

FIG. 4 illustrates an example of input data written with the pen 5.

As shown in FIG. 4, reference numeral 401 denotes an example showing a sequence of characters, or "ABC", written manually, and reference numeral 402 denotes an example showing graphics manually written, such as a circle, triangle or square. On the other hand, reference numeral 403 denotes an example of kinds of gestures indicating requests for editing to be made or rewritten on the screen as loci of the pen point entry, which are directed from left to right to a "request for deleting", a "request for editing a sequence of characters", and a "request for changing line". Further, reference numeral 404 denotes an example of scribbles indicating remarks or comments. In this case, the scribble indicates the addition of a sequence of characters, or "EFG?", to the sequence of the characters "ABC".

FIG. 5 shows an example of a display data prepared by converting and rewriting the manual input data as shown in FIG. 4 on the basis of the flow chart as shown in FIG. 2 into shapes and arrangements clear or easily visible for deciding and recognizing the manual input data.

As shown in FIG. 5, reference numeral 501 shows an example of the result of recognition obtained and converted by recognizing the manually entered sequence of the characters, "ABC", as indicated by reference numeral 401 in FIG. 4. Likewise, reference numeral 502 shows an example of the results of recognition obtained and converted by recognizing the gestures indicative of requests of editing, i.e. circle, triangle and square, as indicated by reference numeral 402 in FIG. 4, respectively. Further, reference numeral 503 shows an example of the results of recognition, i.e. the request for deleting, the request for editing a sequence of the characters, and the request for changing lines, obtained and converted by recognizing the loci of the pen point entry from left to right, as indicated by reference numeral 403 in FIG. 4, as the requests for editing. Furthermore, reference numeral 504 shows an example of the result of recognition, as indicating the insertion of the sequence of the characters, "FEG?", into the sequence of the characters "ABC", obtained and converted by recognizing the manually written scribble as indicated by reference numeral 404 in FIG. 4.

The table below shows an example of the procedures for determining the process at step 202 by providing the input data with the order of priority.

As will be described in Table below, the classification 1 under column 601 indicates the kinds of the input data, such as the length of the input data, the position thereof, the edited status thereof, the attribute thereof, the designation by the user, and the order thereof. Further, the classification 2 under column 602 indicates information of the input data, which further represents the details of the classification 1. The column 603 entitled "Order of Priority" indicates the order of priority of recognition for characters, graphics and gestures, which is represented by the equality and/or inequality, when the input data belongs to the classification 1 end the classification 2. Further, in the Table below, the information on, for example, length of the input data, position thereof and the like is grouped by each of the kinds and each group is further classified into more specific groups. These groups are provided with the order of priority. In addition, the group of information may be selected in accordance with use and status and it is combined with the other groups and stored in a file. It can also be noted that, when the group of information is selected in accordance with use and status, it is not required to use all information and some pieces of information may be employed.

In the Table below, reference symbol "GP" referred to under the column "Order of Priority" means the graphic, "GT" means the gesture, and "CR" means the character.

For example, when the operator draws the scribble indicated as the reference number 402 in FIG. 4, the size of the scribble is larger than the maximal length of the character. Thus, the order of priority is GP(Graphic)≧GT(Gesture) >CR(Character). And, as the other input data is not granted in the peripheral region of the scribble, the order of priority is GP=CR>GT.

According to the synthetic order of priority, since GP is in the highest position, the graphic recognizing means is selected, then the scribble of the reference number 402 is recognized as an ellipse. Therefore, the ellipse indicated as the reference number 502 in FIG. 5 is displayed.

As a second example, when the operator draws the scribble indicated as the reference number 403 in FIG. 4, the scribble overlaps with the display data. Thus, the order of priority by position is GT>CR>GP. As GT is in the highest position, the gesture recognizing means is selected, then the editing pad is displayed as the reference number 503 in FIG. 5.

TABLE

|   |   | 601 Classification 1 | 602 Classification 2 | 603 Order of Priority |
|---|---|---|---|---|
| 1 | 1 | Length | The size of the scribble is larger than the maximal length of the character. | GP ≧ GT > CR |
|   | 2 | Length | The size of the scribble is considerably larger than the maximal length of the character. | GP > GT > CR |
| 2 | 1 | Position | No display data exists in the vicinity of the scribble. | GP = CR > GT |
|   | 2 | Position | The scribble exists within the display data. | CR > GP > GT |
|   | 3 | Position | The scribble overlaps with the display data. | GT > CR > GP |
|   | 4 | Position | The display data exists in the vicinity of the scribble. | GP = CR > GT |
| 3 | 1 | Edited Status | The display data contains the data to be selected. | GT > CR = GP |
|   | 2 | Edited Status | The document is to be newly created. | GP = CR > GT |
|   | 3 | Edited Status | The document has already been created. | GT > CR = GP |
| 4 | 1 | Attribute | The graphics prevail in the document region. | GP ≧ GT > CR |
|   | 2 | Attribute | The characters prevail in the document region. | CR ≧ GT > GP |
| 5 | 1 | Designation by User | The user designates the graphic. | GP > GT |
|   | 2 | Designation by User | The user designates the character. | CR > GT |
| 6 | 1 | Order | The entry of characters is to be continued. | CR > GT > GP |
|   | 2 | Order | The entry of gestures is to be continued. | GT > CR = GP |
|   | 3 | Order | The entry of graphics is to be continued. | GP > GT > CR |
|   | 4 | Order | The gesture exists only one before. | CR = GT > GT |

Figure 6:
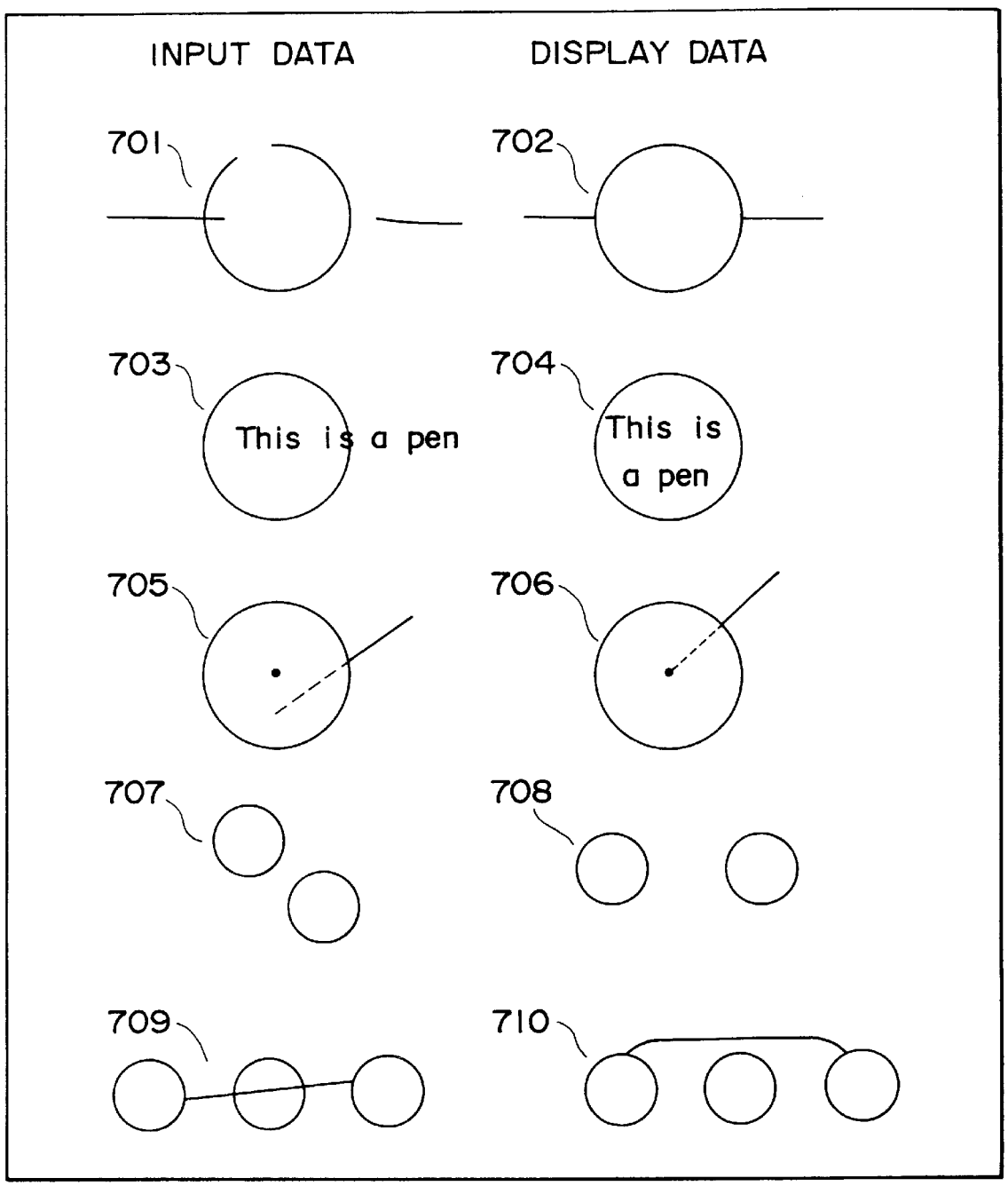
FIG. 6 is a diagram showing an example of rewriting an input data into a display data in shapes and arrangements clearer or easily visible for deciding and recognizing the input data.

FIG. 6 shows an example of the input data and the corresponding display data which is rewritten in clear or easily visible shapes and arrangements when the input data is converted into the display data at step 208.

For instance, when the input data 701 is written in such a way as its end point intersects with the other line or on end of a line is apart from the portion to which the end thereof should be attached, it is converted and written into the display data 702 in which its end point is not intersecting with the line or its end is attached thereto. Further, when a sequence of characters is written in such a manner as bridging the designated graphic or projecting therefrom, as indicated by reference numeral 703, it is corrected such that it is arranged so as to be placed in the graphic or to comply with the graphic, as indicated by reference numeral 704. Additionally, if the line is not directed to the reference point of the graphic as indicated by reference numeral 705, it is written in such a way that the line is passing through or directed to the reference point thereof, as indicated by reference numeral 706. In addition, when graphics having similar shapes are written in similar positions, as indicated by reference numeral 707, the grid is corrected so that the central points of the graphics are aligned horizontally with each other, as indicated by reference numeral 708, or for the graphic to be brought into contact with or aligned with the grid. Graphics having different shapes can be handled in similar manner. Furthermore, if the line that should not intersect with the graphic is drawn in such a way that it intersects with the graphic or graphics, as indicated by reference numeral 709, the line can be so corrected and rewritten as not to intersect with the graphic or graphics, as indicated by reference numeral 710.

FIG. 7 shows an example of the configuration of a system comprising an input device and an display device separately. Specifically, this system comprises the input device 1 and the display device 4, each being comprised of a different unit.

FIG. 8 shows an example of the configuration of a system in which an input device is integral with an display device. Specifically, this system contains an input-display device 12 which comprises the input device 1 integral with the display device 4. The input-display device 12 may be mounted with the data processor 2 and the data storage 3.

Figure 9:
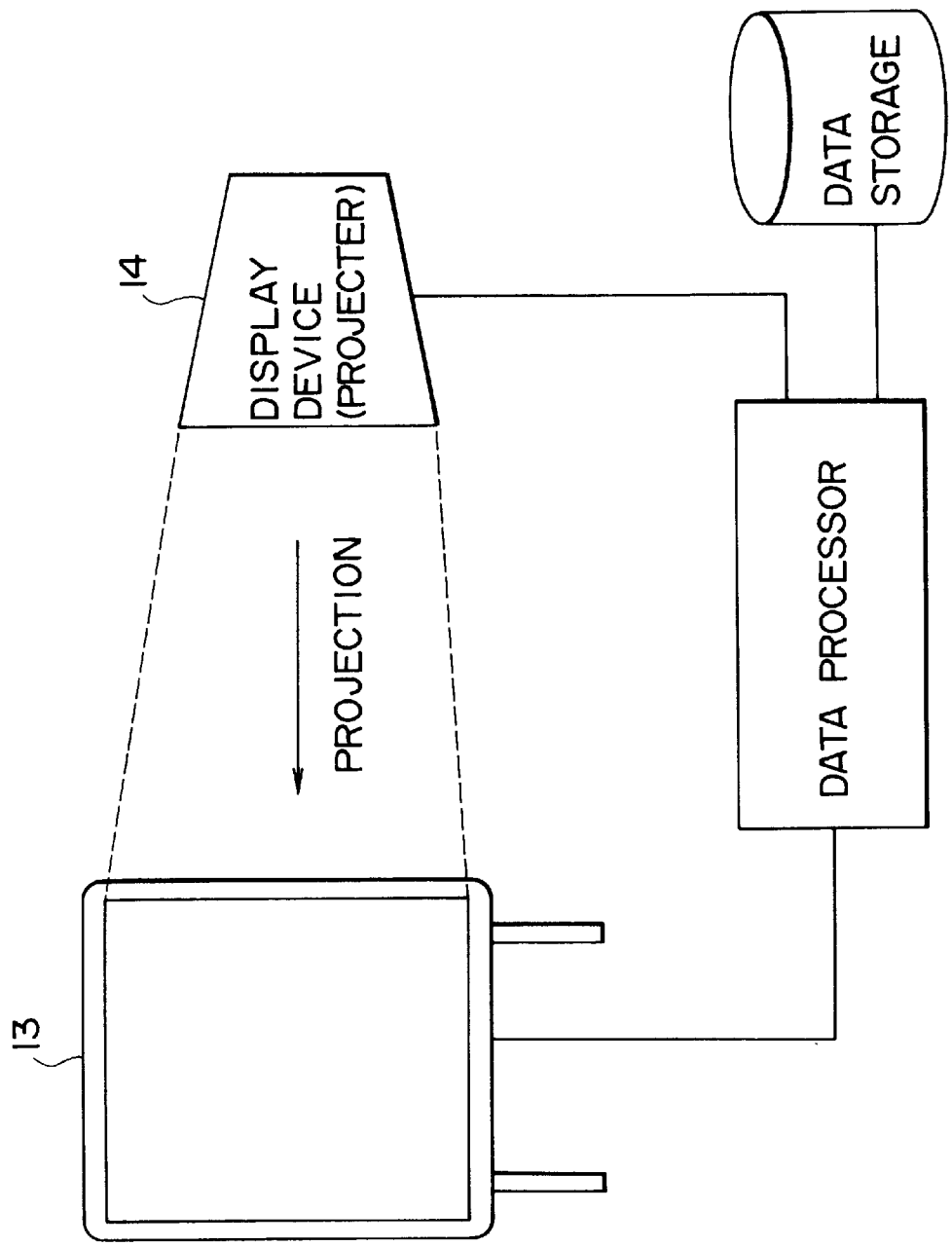
FIG. 9 is a diagram showing an example of the configuration of a system in which an input device and a display device can be adjusted with a user.

FIG. 9 shows an example of the configuration of a system in which an input device and a display device can be adjusted by a user. This system may comprises an input device 13 including an electronic white board or the like and a display device 14 including a projector or the like.

Figure 10:
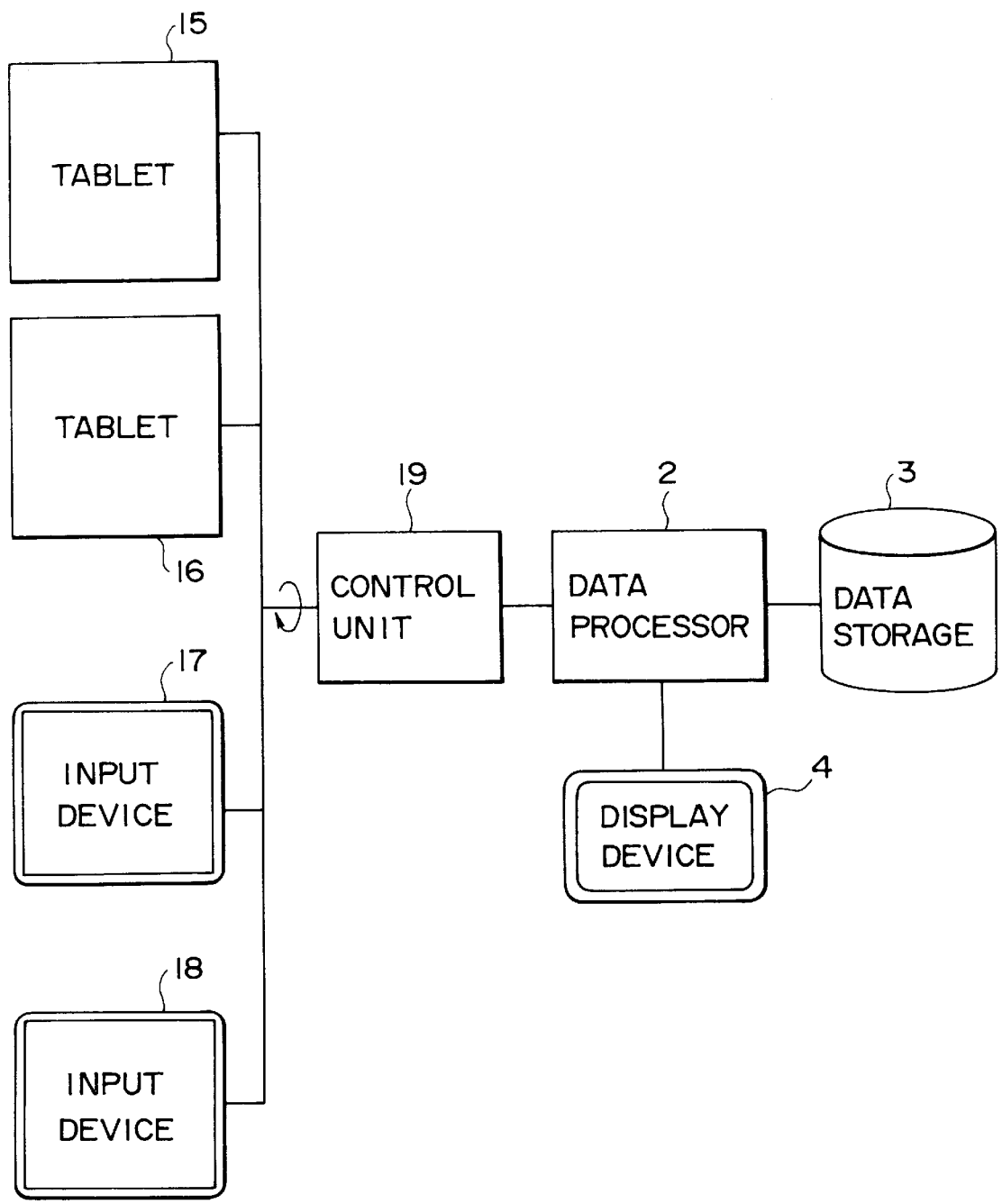
FIG. 10 is a diagram showing an example of the configuration of a system in which an input device and a graphics tablet are provided.

FIG. 10 shows an example of the configuration of a system in which an input device and a graphics tablet are provided. For instance, a plurality of input devices, such as graphics tablets 15 and 16 as well as input devices 17 and 18 may be connected with a control unit 19. In this case, the control unit 19 is so arranged as to receive one entry from one pen point at the one time for the data processor 2. The method for controlling the entry of pen points may be conducted, for example, on a first arrival basis, a priority basis, or a round robin scheduling basis.

FIG. 11 shows an example of the configuration of a system in which a plurality of devices configurations are connected with each other through a network. To a network 20, there may be connected an arbitrary number of configurations as shown in FIG. 7, 8, 9 or 10. They may be connected with the network 20 through a wire, wireless, local area network, or global network system.

The system according to the present invention allows data containing characters and graphics in a mixed fashion to be entered and edited through the pen point entry only without paying any consciousness to any commands. Further, the characters, graphics and commands can be subjected to processing only via the operation of the pen point entry.

What is claimed is:

1. A system for editing a character or a graphic through pen point entry of data in a computer system having a pen point entry means, comprising:

a character recognizing means for recognizing characters;

a graphic recognizing means for recognizing graphics;

an editing request recognizing means for recognizing editing requests;

an input deciding means for deciding whether the data entered through said pen point entry means is a character, a graphic or an editing request according to an order of priority previously established and corresponding to characteristics of the data entered through said pen point entry, and deciding a suitable recognizing means from said character, graphic and editing request recognizing means on basis of a classification condition;

a storage means for storing a result of recognition by a suitable recognition means decided by said input data deciding means; and a display means for displaying said result, and wherein the order of priority provided for each of said character recognizing means, said graphic recognizing means, and said editing request recognizing means is dynamically changed.

2. A system according to claim 1, wherein each of said character recognizing means, said graphic recognizing means, and said editing request recognizing means is provided with an order of priority when said data drawn and entered through said pen point entry means is determined whether said data is a character data or a graphic data or an editing request.

3. A system according to claim 2, wherein the order of priority of said character recognizing means, said graphic recognizing means, and said editing request recognizing means is determined with reference to a trace of said data entered through said pen point entry means or said input data deciding means for recognizing the result of said decision stored previously.

4. A system according to claim 2, wherein:

all of said character recognizing means, said graphic recognizing means, and said editing request recognizing means are operated in a parallel fashion for recognizing said data entered through said pen point entry means as an object of recognition;

all results of recognition obtained by said recognizing means are compared; and said recognizing means having the highest order of priority is adopted from the most acceptable or reasonable results of recognition.

5. A system according to claim 1, wherein the order of priority is previously established according to a first classification corresponding to a kind of input data and a second classification representing details of the first classification.

6. A method for editing a graphic using a pen point entry means; comprising:

a character recognizing step for recognizing a character data;

a graphic recognizing step for recognizing a graphic data;

an editing request recognizing step for recognizing a command for an editing request;

an input data deciding step for deciding whether the input data entered through said pen point entry means is a character, a graphic or an editing request according to an order of priority previously established and corresponding to characteristics of the data entered through said pen point entry, and deciding the order of priority of each of said recognizing steps on basis of a classification condition;

a selecting step for selecting the recognizing step with the highest order of priority from said character, graphic and editing request recognizing step on basis of the result of said input data deciding step;

a recognition result deciding step for deciding whether the result of the recognition executed by said selecting step is suitable;

a storing step for storing a result of said recognizing step when the result of a recognition is suitable; and a repetition step for repeating the recognition of said input data using by the recognizing step with the next highest order of priority until the result of the recognition is suitable, and wherein said order of priority of each recognizing step provided by said input data deciding step is dynamically chanced.

7. A method according to claim 6, wherein said input data deciding step excludes the recognizing step with a low order of priority from the object of recognition.

8. A method according to claim 6, wherein the order of priority of said recognizing step is decided with reference to a trace of said data entered through said pen point entry means and to the result of a recognizing step stored previously.

9. A method according to claim 6, wherein:

said character recognizing step, said graphic recognizing step, and said editing request recognizing step are operated in a parallel fashion for recognizing said data entered through said pen point entry means as an object of recognition;

all results of recognition obtained by said recognizing steps are compared; and said recognizing step having the highest order of priority is adopted from the most acceptable or reasonable results of recognition.

10. A system for editing data entered through a pen point entry means for a computer system with said pen point entry means integral with a display means comprising:

a character recognizing means for recognizing characters;

a graphic recognizing means for recognizing graphics;

an editing request recognizing means for recognizing an editing request;

an input data deciding means for deciding whether the data entered through said pen point entry means is a character, a graphic or an editing request according to an order of priority previously established and corresponding to characteristics of the data entered through said pen point entry, and deciding a suitable recognizing means from said character, graphic and editing request recognizing means on basis of a classification condition;

a storage means for storing a result of recognition by a suitable recognition means decided by said input data deciding means; and a display means for displaying said result, and wherein the order of priority provided for each of said character recognizing means, said graphic recognizing means. and said editing request recognizing means is dynamically changed.

11. A system according to claim 10, wherein the order of priority is previously established according to a first classification corresponding to a kind of input data and a second classification representing details of the first classification.

* * * * *